May 5, 1959
H. A. WILCOX
2,885,508
VEHICLE DETECTOR
Filed March 5, 1956
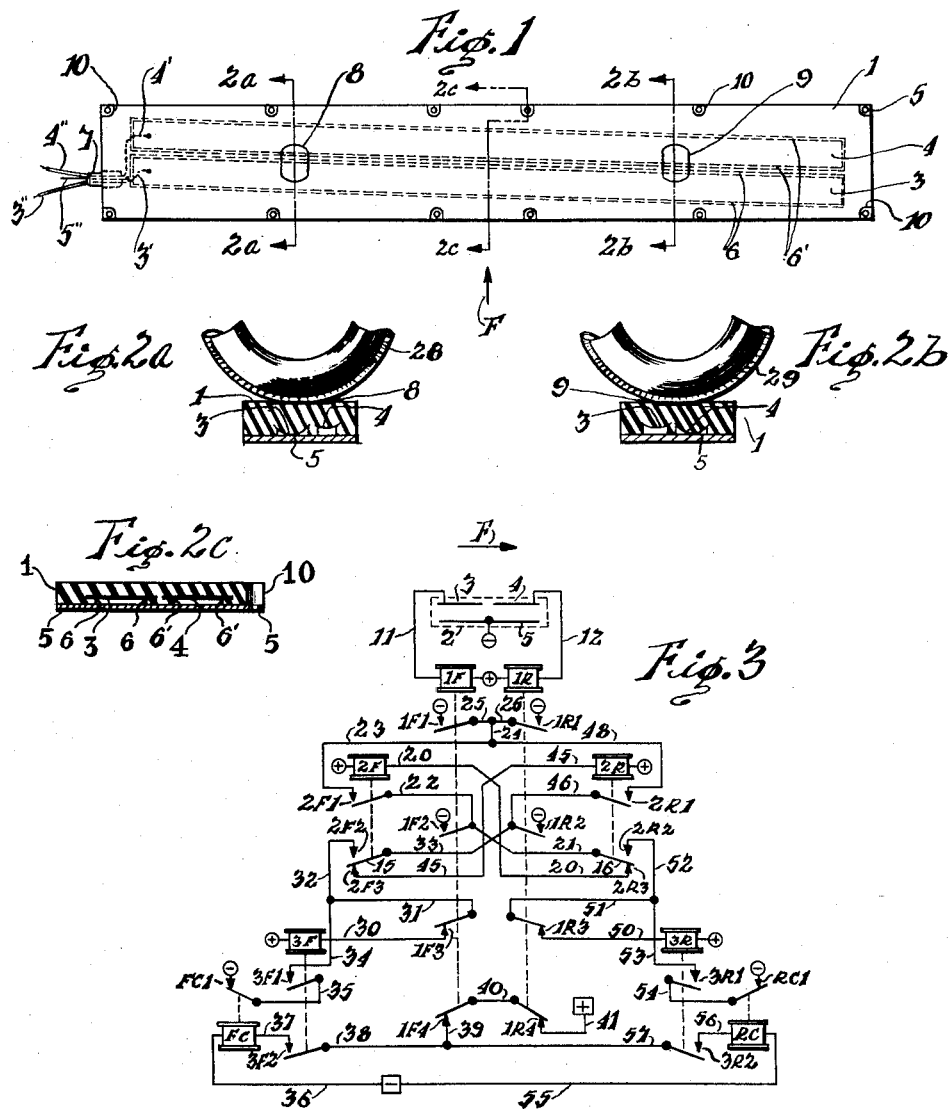
INVENTOR.
HARRY A. WILCOX
BY Edward W. Eames
ATTORNEY

United States Patent Office 2,885,508
Patented May 5, 1959

2,885,508

VEHICLE DETECTOR

Harry A. Wilcox, Westport, Conn., assignor to Eastern Industries, Incorporated, East Norwalk, Conn., a corporation of Delaware Application March 5, 1956, Serial No. 569,602

16 Claims. (Cl. 200—86)

This invention relates to a multi-contact treadle switch for road traffic and to an improved electrical counting circuit or response circuit employing such treadle switch. The term "road traffic" is used to include wheeled vehicles such as automobiles, having flexible or pneumatic tires covering a substantial area of the roadway in supporting the weight of the vehicle on wheels spaced apart transverse to the direction of movement of the vehicle, and includes automotive vehicles in a toll collection lane or in a low speed vehicle weighing lane for example.

The treadle switch and circuit are particularly adapted to respond primarily to rolling wheels of automobiles in axle counting or axle group checking in connection with toll checking or toll collection lanes, as distinguished from ordinary walking on the treadle for example, and are especially designed in a novel manner to meet the problem of responding properly to small light weight cars traveling at very low speeds, while also serving to respond to heavy cars and trucks.

The increasing use of small lightweight cars on roads and highways has presented a serious problem to modern toll checking equipment which must be designed for a very high standard of accuracy in the counting of axles and, in some types of such equipment, in the exact matching of axle group registration by the treadle against corresponding manual keyboard registration by the toll collector or toll ticket issuer for multi-axle vehicles such as trucks and busses for example.

Particularly in instances where the treadle is located ahead of the toll collection point, as in checking-in axles or in weighing vehicles prior to arrival at the toll checker's window, a line of vehicles may form from time to time and the wheels of some vehicle may be resting on the treadle or just off its edge, and the consequent motion of the wheels over the treadle may be extremely slow as the vehicle just starts to move or rolls to a stop behind another vehicle.

Treadles and treadle circuits for toll checking in general employ an overlapping sequence of contact of the multiple contacts of the treadle to obtain a reliable registration of passage of the vehicle wheel by its rolling action, and rely on concurrent action of the wheels at the opposite sides of the car on given axle to give a single registration for a single axle or set of wheels in the same longitudinal position on the vehicle. Thus the right and left front wheels of a vehicle together will give one axle count or registration in the treadle circuit for example, as will the pair of rear wheels on a passenger vehicle or a pair of dual wheels on corresponding axles on opposite sides of a truck or trailer. Successive wheels, closely spaced in tandem on successive axles as found in some trucks, trailers or busses, are registrated as successive axles, so that the treadle circuit and counter or other output device must respond and release rapidly for each axle to be prepared for response to a closely following axle.

In the case of most treadle circuits in use for toll checking and the like at least two sets of treadle contacts are arranged to be engaged successively in overlapping sequence, and the circuit responds to such overlapping sequence of actuation by a rolling wheel or set of wheels on an axle, to provide one output or forward count for each complete traverse in a forward direction and a different output or reverse count for each complete traverse in the opposite direction.

By making such circuit rely on some overlap of closure of adjacent treadle contacts the proper directional sequence can be maintained for response to the rolling wheel. Although it is possible in such a circuit to produce an artificial overlap by employing slow release relays or the electronic equivalent, the release lag would have to be extremely small to avoid missing the second of two closely spaced tandem axles, and thus for the very slowly moving vehicles often found in a toll lane with accumulation of vehicles, such release lag may expire and thus lose continuity of the artificial overlap.

In order to provide reliable long operating life under heavy truck and bus loads as well as the lighter vehicle loads, the most effective treadle switch construction with which I am familiar employs adjacent contact plates elongated transverse to the direction of traffic and very closely spaced horizontally in the direction of traffic, as well as closely spaced vertically over a base contact plate which may be common to the upper contact plates. Insulating supporting strips extend under the edges of the plates for a very short distance, and are attached to insulating material between the upper plates and extending over and around these upper plates and attaching to the lower or base plate on all sides, to provide a protective shield and to seal the contacts against moisture. This cover of insulating material is resilient, as of rubber compound for example.

The upper contact plates are flexible thus permitting them to be depressed in their central area by the loaded tire pressure into contact with the lower plate and thus to close a circuit. In order to permit this proven construction to be retained while making it more sensitive to light vehicles to assure an overlapping of closure of successive contacts when the wheel is on the dividing line between successive plates presented a problem.

In accordance with the invention this problem was solved by the novel arrangement of the successive plates at an angle with respect to the path of traffic or the toll lane, while keeping the successive plates parallel to each other.

From one aspect the invention may be applied by turning the entire assembly of upper and lower contact plates at a slight angle in the toll lane or roadway with respect to the path of traffic.

While this would be technically satisfactory in new installations, it necessitates more care and control of installation procedure and is objectionable as appearing to the public to be out-of-line and esthetically improper, and would be impractical and costly in adapting existing installations of straight contact treadle assemblies to the new slanted construction.

Therefore in the preferred aspect of the invention the upper plates and edge-supporting strips only are slanted at a slight angle with respect to the lower plate, which latter serves as a base plate for mounting the assembly into the usual heavy metal frame, which is set permanently into the pavement. This preferred construction permits the slanted plate type treadle switch unit to be interchangeable mechanically as a replacement for the prior straight plate treadle switch unit in the same frame.

Thus in accordance with the invention a slanted plate treadle switch assembly is provided to obtain overlapping closure of successive treadle contacts as the wheels on the opposite ends of the same axle rest on or pass over the dividing line between the adjacent edges of successive plates, since the slanting of the plates at a controlled angle to the path of traffic causes the leading edge of the tire pressure pattern on the treadle of the leading wheel to extend further on the second plate and actuate it while the lagging edge of the lagging wheel of the same axle extends further backward on the first plate to maintain continuity of actuation in overlapping closure of the successive contacts.

It is an object of the invention to provide a method or means of obtaining a positive overlap of impulses from a pair of slowly moving vehicle wheels passing substantially abreast along a road traffic lane, despite successive non-overlapping impulses from the individual wheels, by displacing the production of successive impulses from the respective wheels in opposite directions along the line of passage in such lane.

It is also an object of the invention to provide an improved structure which will provide an overlapping sequence of impulses upon passage of a vehicle in road traffic.

It is another object of the invention to provide an improved response circuit which will provide an output impulse distinctive of direction of passage of a pair of vehicle wheels substantially abreast over a treadle providing an overlapping sequence of impulses in the circuit from said passage.

It is an additional object of the invention to provide a multi-contact treadle switch unit for road traffic in which successive adjacent switch contacts, elongated transverse to the direction of traffic, are arranged at a slight angle with the perpendicular to such direction to enable the wheels on opposite ends of the same axle of a light weight vehicle to close the successive contacts in overlapping sequence despite non-overlapping of closure of the successive contacts by the respective wheels individually.

It is also an object of the invention to provide a treadle switch assembly for road traffic and having successive elongated substantially parallel switch units assembled with an elongated base adapted for mounting in an elongated frame embedded in a road surface substantially perpendicular to the path of traffic, in which the successive switch units are slanted at a slight angle with the long axis of the base to enable the wheels on opposite ends of the same axle of light weight vehicles to close successive switch units in overlapping sequence.

It is a further object of the invention to provide an axle counting or indicating circuit for road traffic including a multi-stage chain of relays cooperating with a multi-contact treadle having a series of substantially parallel contacts elongated for disposal transverse to a traffic lane and arranged closely side by side for closing of the contacts in sequence by a single vehicle wheel rolling along the traffic lane, the chain of relays requiring an overlapping sequence of such contacts to provide an output responsive only to traverse of the treadle contacts in a given direction along the lane, said treadle contacts being slanted at a slight angle with respect to the perpendicular to the direction of traffic in the lane to enable corresponding wheels on opposite sides of the vehicle to provide such overlapping of successive contacts between the leading and lagging edges of the wheels by the lagging and leading positions of the contacts respectively in such slant.

It is also an object of the invention to provide a multi-contact treadle for a toll checking or weighing lane for road traffic and having successive contacts substantially parallel and closely adjacent along the axis of such lane and elongated transverse to such lane on approach to a toll or weight checking booth at one side of such lane, in which the parallel contacts are all slanted uniformly at a slight angle with the perpendicular to the axis of such lane such that the end of the contacts nearest the booth leads the end of the contacts farthest from the toll booth for obtaining a positive overlap of actuation of successive contacts by corresponding wheels on opposite sides of a vehicle approaching such booth in such lane.

Fig. 1 shows a plan view of a two contact treadle switch unit with contact plates slanted, according to one aspect of the invention.

Figs. 2a and 2b show vertical sectional views along lines 2a—2a and 2b—2b respectively of Fig. 1, and partial views of the left and right wheels respectively of the same axle of a vehicle being illustrated as centered on the long axis of the treadle unit.

Fig. 2c shows an enlarged vertical sectional view of the treadle unit along the line 2c—2c of Fig. 1, about mid-way between the two ends of the treadle unit.

Fig. 3 shows one form of response or counting circuit adapted to incorporate a treadle according to the illustration, this circuit corresponding to that disclosed and claimed in U.S. Patent 2,603,419 entitled "Treadle Controlled Counting System" granted July 15, 1952, to John L. Barker and Edward H. Eames and assigned to Eastern Industries, Incorporated.

Referring now to Figs. 1, 2a, 2b and 2c in more detail, these figures show a treadle unit according to the invention with the left and right wheels of a vehicle centered on the long axis of the treadle unit, which is adapted for installation in a mounting frame (not shown) for removably embedding the unit in the surface of the roadway of a traffic weighing or toll checking lane, the long axis of the treadle unit being normally arranged perpendicular to the direction of traffic movement indicated by the arrow F.

The treadle unit ordinarily covers nearly or substantially all of the width of the traffic lane associated with the toll checking or weighing booth.

The treadle unit includes a resilient waterproof casing 1 of insulating material such as rubber compound for example, over and preferably attached to the top surfaces of the elongated rectangular contact plates 3 and 4, and attached along and for some distance inside the outer edges of a base plate 5. The upper contact plates or contacts 3 and 4 shown in broken line form under the casing 1 in Fig. 1 are of metal, such as steel for example, and relatively thin and resilient to be flexed downward into electrical contact with the metal lower plate 5 by pressure of a loaded pneumatic tire of a vehicle such as an automobile on the contact, and to be restored to normal separation over the lower plate upon release of such pressure after passage of the wheel.

The upper contact plates 3 and 4 are each supported under their several edges by insulating strips or spacers 6 and 6' for contact plates 3 and 4 respectively, these strips also appearing in broken line form inside the edges of the contact plates 3 and 4 in Fig. 1.

The base plate 5 may be of steel for example, and not only serves as a contact plate but also preferably is considerably thicker than the upper plates so as to be substantially rigid to serve as a mounting base for removably attaching the treadle unit into the associated frame for mounting in the roadway.

Wires 3' and 4' are connected to the contacts 3 and 4 respectively near one end as shown in Fig. 1, and are separately insulated and grouped into the protective flexible sheath 1, appearing externally as leads 3" and 4" for connection into an appropriate relay response or counting circuit, as in Fig. 3 for example.

For convenience of construction the base plate 5, serving as the lower contact cooperating with the upper contacts 3 and 4 in the electrical circuit, is exposed and is electrically grounded, the external lead 5" being connected to the base plate 5 for a good electrical connection to the frame (not shown) or other grounded wire or terminal.

The insulating waterproof casing 1 is cut out or recessed at several points 10 spaced along its outer edges to expose the base plate 5, which has holes through it at these points as shown in Fig. 1 and Fig. 2c, through which bolts may be placed for fastening the treadle unit into a frame for mounting in the roadway.

The rounded rectangular loops 8 and 9 in Fig. 1 indicate the outline of the pressure patterns of the tires of the left and right wheels of the same axle of a vehicle, on the surface of the treadles, as also shown edgewise in Figs. 2a and 2b respectively. Although not limited thereto these two similar tire pressure patterns 8 and 9 may represent the front wheels of a small light automobile having a transverse tread width between wheels of about four feet for example.

It will be noted that the contact plates 3 and 4 are substantially parallel to each other but are slanted slightly with respect to the long axis of the treadle unit, the left end leading the axis and the right end lagging behind the axis in the direction of traffic F, in one preferred form for example.

For the purpose of illustrating the effect of slanting the contact plates 3 and 4 at a slight angle to the long axis of the treadle unit, which is substantially perpendicular to the direction of traffic in the toll or weight checking lane, the left and right wheels are illustrated in Figs. 1, 2a and 2b in the critical position for obtaining overlapping closure of adjacent successive contacts 3 and 4 with the base plate 5; that is, these wheels and their tire pressure patterns are centered in their traverse of the adjacent successive treadle contacts in the direction of traffic F. It may be assumed either that the wheels are in motion rolling over the treadle unit and are passing this center point in their traverse momentarily or that the wheels have stopped in this position in their traverse to resume rolling later.

In this position illustrated, because of the slant of the contacts of the treadle unit, it will be seen that the pressure pattern of the left wheel lags behind the dividing line between the two adjacent contacts 3 and 4 and the pressure pattern of the right wheel leads this dividing line by an equal amount, although the axle of these wheels is parallel to and substantially in line with the axis of the treadle unit.

Thus, due to this slight slant the left tire pattern 8 will extend far enough back on to the surface of the treadle unit above contact plate 3 to depress this plate into electrical contact with base contact plate 5, and similarly the right tire pattern 9 will extend far enough ahead on to the surface above contact plate 4 to depress the latter into electrical contact with plate 5. Therefore there will be a positive overlapping of closure of the adjacent contacts by cooperation of the spaced wheels and the slant of the contact plates despite the fact that either one wheel alone is closing only one of the contacts. This is illustrated in the depression of contact plate 3 to touch base contact plate 5 near the center of the contact plate 3 in Fig. 2a, where this sectional view shows the plates 3 and 4 off center toward the right, corresponding to the direction F of Fig. 1, and in the depression of contact plate 4 to touch base plate 5 near the center of plate 4 in Fig. 2b, where this sectional view shows the plates off center to the left, opposite to the direction F, the contact plate 4 in the area of 2a and the contact plate 3 in the area of 2b not being depressed enough for electrical contact.

Since this overlapping of contact closure occurs at this point, there will be a partial overlap of output impulses from contacts 3—5 and 4—5 on leads 3″ and 4″ in passage of the transversely spaced wheels, and consequently there will be an overlapping output sequence of closure of one contact alone, then both together, then the other alone, while the wheels are crossing the treadle unit.

The slant of the contacts in the treadle unit is somewhat exaggerated in Figs. 1, 2a and 2b for clearness of illustration, and the slant found to be effective in actual construction and use is slighter than shown and is of the order of one inch in a total length of about eight feet for example.

Referring now to Fig. 3 there is illustrated one form of response or counting circuit requiring an overlapping sequence of closure of adjacent successive contacts, and in which the slanted contact feature of the invention is of clear importance with the recent increasing use of smaller lighter vehicles. This circuit is bi-directional in providing a forward output or count by operation of counter or electrical output device FC for complete traverse of the treadle unit 2 in the direction F, and a reverse output or count by operation of counter or electrical output device RC by complete traverse of the treadle 2 in the opposite direction.

The treadle unit as described in connection with Figs. 1 and 2c may serve as the treadle unit 2 shown schematically in cross-section at the top of Fig. 3, and having upper contacts 3 and 4 and lower common contact 5 corresponding to the similarly numbered contact plates in Figs. 1 and 2c.

The circuit of Fig. 3 is symmetrical for the forward and reverse directions and the several relays 1F, 2F and 3F as well as FC are associated primarily with the forward direction or sequence of operation of the treadle contacts, whereas the relays 1R, 2R and 3R, as well as RC are associated primarily with the reverse direction or sequence of operation of the treadle contacts, each sequence requiring an overlapping closure of the successive contacts 3—5 and 4—5 for operation of the output device FC or RC respectively.

The relays 1F and 1R, while associated with the forward and reverse sequence respectively in accordance with which is operated first, are also both involved in both forward and reverse sequences since they are connected respectively by wires 11 and 12 to contacts 3 and 4 for operation of relay 1F directly by closure of contacts 3—5 and for operation of relay 1R directly by closure of contacts 4—5. Thus both relays 1F and 1R will be operated by concurrent closure of contacts 3—5 and contacts 4—5 as is required in part for obtaining operation of either output device FC or RC through the appropriate several stages of the overall circuit.

The power source for the relays of the circuit of Fig. 3 is illustrated by the terminals plus in a circle and minus in a circle, and a separate power source is indicated as preferable for the output devices FC and RC as illustrated by the terminals plus in a square and minus in a square.

The relays have the respective operating contacts arranged vertically beneath the coils designated by the reference characters of the relays and associated therewith by the vertical broken lines in Fig. 3.

Briefly the operation of the circuit of Fig. 3 is as follows. For the forward sequence, the treadle contacts 3—5 first close and operate relay 1F. The consequent closure of contact 1F2 of relay 1F operates relay 2F, via contact 2R3 of relay 2R. As the wheels roll further so as to close treadle contacts 4—5 concurrently with contacts 3—5, the relay 1R is operated concurrently with relay 1F to provide a lock-in circuit to maintain relay 2F operated via contacts 1R1, 2F1 and 2R3.

Relay 1F releases as the wheels roll further to reopen contacts 3—5, relay 2F remains locked-in over contacts 1R1, 2F1 and 2R3, and relay 3F becomes operated via contacts 1R2, 2F2 and 1F3, and locks in via contacts 3F1 and FC1. As the wheels complete the traverse of the treadle by rolling forward off contact 4 to reopen contacts 4—5 while contacts 3—5 remain open, the relay 1R is released, and the consequent closing of contact 1R4 completes a circuit for operating output device FC via contacts 1R4, 1F4 and 3F2. The operating of the forward output device FC releases relay 3F by opening contact FC1. Relay 2F was released by the opening of contact 1R1 by release of relay 1R as the wheels left the treadle, so that the circuit is restored to normal inactive condition after operation of the forward output device FC.

Similarly for the reverse sequence the relay 1R is first operated by initial closure of treadle contacts 4—5, with consequent operation of relay 2R via contacts 1R2 and 2F3. As the wheels continue in the reverse direction, relay 1F is operated concurrently with relay 1R by overlapping closure of treadle contacts 3—5 with 4—5, and a lock-in circuit is provided for relay 2R via contacts 1F1, 2R1 and 2F3.

As the wheels leave contact 4 in the reverse direction, reopening contacts 4—5 while holding contacts 3—5 closed, the relay 1R is released with consequent operation of relay 3R via contacts 1R3, 2R2 and 1F2. As contacts 3—5 open by passage of the wheels off the treadle unit in the reverse direction, the relay F1 is released and consequently the output device RC is operated via contacts 1R4, 1F4 and 3R2, and the relay 2R is also released by the opening of contact 1F1. The operation of the reverse output device RC releases relay 3R (which had been locked in via contacts RC1, 3R1 and 1R3) to restore the circuit to normal.

Reference may be had to Patent 2,603,419 mentioned above for a more detailed description of the circuit of Fig. 3 if desired, but in any event it will be noted that the operation of this circuit is dependent on an overlapping sequence of operation of adjacent successive contacts, as with most direction or sequential circuits for toll checking or weighing of vehicles in road traffic with which I am familiar, and the incorporation of a treadle unit with slanted contacts according to the invention provides an improved circuit enabling operation with smaller lighter vehicles as well as with ordinary or larger heavier vehicles.

Although only a two contact treadle and a two contact overlapping sequence circuit are shown in the drawings, it will be understood that this is merely illustrative and treadles of three or more contacts may be used if desired as by adding more contacts similar to contact plates 3 and 4 and widening the treadle and lower contact plate 5 in the direction of traffic movement F or by subdividing the treadle into more contacts for example; and similarly relay circuits having more stages of overlapping sequence may be employed for the three or more contact treadles. The U.S. Patents 2,311,359 granted February 16, 1943, and 2,483,394 granted October 4, 1949, to John L. Barker, entitled "Control System" and assigned to Eastern Industries, Incorporated or its predecessor Automatic Signal Corporation, are examples of multi-contact treadle circuits having more than two contacts involving overlapping sequence.

Although the treadle as illustrated in Figs. 1, 2a and 2b, shows the contacts angled with the left end leading (beyond the long axis of the treadle) and the right end lagging (behind the long axis of the treadle) in the direction F, as appropriate for traffic approaching a toll checking or weight checking booth at the left, this is by way of example of the preferred form for the usual preferred left side booth arrangement for approaching traffic, since in such cases the vehicles tend slightly toward the left in passing over the treadle.

The same arrangement as shown in Fig. 1 will serve equally well for a vehicle approaching a left side booth (with respect to the vehicle) in the direction F, such booth being on the left side of Fig. 1, or for a vehicle approaching a left side booth (with respect to the vehicle) in the direction opposite to F, such booth being on the right side of Fig. 1.

This same arrangement would also serve for use on checking traffic departing from a right side booth (with respect to the vehicle).

Although the treadle unit is shown with its connecting leads at the left as ordinarily most appropriate to be nearest to a toll or weight checking booth at the left for direction F, the treadle unit may be turned around with such leads at the end opposite such booth if desired to meet local wiring arrangements, without any change of operation or function. This may be done to adapt the treadle unit to a frame arranged for leads at the opposite end or where a frame is adapted for connection leads at either end.

In the case of use for traffic approaching a righ side booth however, or for traffic leaving a left side booth the angle of slant of the contacts is exactly reversed from that shown in Fig. 1, so that the left end lags behind the axis in position and the right end leads the axis in position, to allow for the tendency of such vehicles to angle slightly toward the right, instead of toward the left as assumed in Fig. 1, but the construction is otherwise identical with that illustrated in Figs. 1 and 2c.

In this latter alternate arrangement the Figs. 2a and 2b could be interchanged to illustrate the right and left wheels instead of the left and right wheels respectively as shown.

It will be understood that where a vehicle is proceeding along or parallel to the center line of the toll or weight checking lane it makes no difference whether the vehicle approaches in the direction F or in the opposite direction so far as the matter of overlap is concerned, without regard to sequence; and also if vehicles were to travel in this manner consistently it would make no difference whether the treadle contacts slanted from far left to near right as shown or at the reverse angle from near left to far right.

In the preferred form the direction of slant of the angle is chosen for the position of the booth to allow for the tendency of traffic passage to angle slightly toward the booth on approach and slightly away from the booth on departure, the direction of slant in Fig. 1 being for left side position of the booth with respect to approaching vehicles, the more usual position.

The expression "same axle" as used herein is intended to relate to the axle or axles of a vehicle transverse to the vehicle in the same longitudinal position on the vehicle, whether continuous transverse to the vehicle or separated into sections at opposite sides of the vehicle for example.

Although the preferred form of the treadle unit, as illustrated in the drawings and described above, employs a base contact plate common to the two upper contact plates as an electrical contact element as well as a mounting base, and exposed at its edges and underneath, it will be understood that the casing might be extended around and under the plate 5 to provide a completely sealed multi-contact package, or a common lower contact plate of thinner section might be interposed between and insulated from the base plate 5 and the upper plates 3 and 4, or the lower plate might be divided lengthwise into two plates insulated from each other and cooperating with the respective upper plates 3 and 4, with separate connecting leads from the lower plates as alternative constructions within the scope of the invention for example.

My prior U.S. Patent 1,928,472 and the Patent 2,173,089 of C. D. Geer and J. L. Biach, Patent 1,950,490 of C. D. Geer and E. D. Stirlen, and Patent 2,165,227 of B. Cooper disclose other forms of treadle switch construction.

Although several variations have been pointed out above in the embodiment of the invention, it will be obvious to those skilled in the art that various other modifications may be made in the assembly or arrangement of the apparatus and in the parts thereof without departing from the spirit of the invention within the scope of the appended claims.

I claim:

1. A multi-contact treadle switch unit for road traffic, including a plurality of successive switch contacts elongated substantially perpendicular to the direction of traffic and arranged successively adjacent in the direction of traffic, said contacts being placed at a slight angle with the perpendicular to such direction to enable the wheels on opposite ends of the same axle of a lightweight vehicle to close the successive contacts in overlapping sequence despite non-overlapping of closure of the successive contacts by the respective wheels individually.

2. A multi-switch treadle unit for road traffic, including a plurality of switches elongated transverse to the direction of passage of traffic, and said switches being arranged closely adjacent in succession at a slight angle to the perpendicular to such direction to enable corresponding wheels on opposite sides of a vehicle to close the switches in overlapping sequence despite non-overlapping closure of successive switches by the respective wheels individually.

3. A multi-contact treadle switch unit adapted to be disposed transverse to a lane for road traffic, said unit including a plurality of switch contacts elongated transverse to such lane arranged closely adjacent in succession for actuation by vehicle wheels rolling thereover, said switch contacts being slanted at a slight angle with respect to a perpendicular to the direction of passage of traffic whereby wheels on opposite ends of the same axle of the vehicle will cooperate to obtain overlapping closure of adjacent contacts.

4. A multi-contact treadle switch unit having a long axis for disposal substantially perpendicular to the direction of traffic across a traffic lane and having a short axis for disposal in such traffic direction, said unit including a plurality of contacts elongated generally along the long axis and closely adjacent side by side along the short axis for actuation successively by a vehicle wheel traversing the unit along the short axis, said contacts being slanted at a slight angle with said long axis for cooperation of a pair of transversely spaced wheels of a vehicle to obtain overlapping actuation of adjacent contacts.

5. A treadle unit as in claim 4 for a toll checking or weight checking lane having a checking booth at one side of said lane and in which said contacts are slanted toward said booth on the side of said lane nearest said booth.

6. In a circuit for response to the rolling wheels of vehicles in a road traffic lane only upon an overlapping sequence of actuation of successive electrical contacts, a multi-switch treadle unit including a plurality of successive contacts elongated transverse to the direction of passage of traffic, said contacts being arranged closely adjacent in succession in such direction and at a slight angle to the perpendicular to such direction to enable corresponding wheels on opposite sides of a vehicle to close the switches in overlapping sequence.

7. A treadle unit for road traffic, including an elongated base contact plate, a pair of elongated relatively narrow upper contact plates arranged side by side over said base plate, spacing means for supporting said upper contact plates along the edges thereof to maintain them normally separated from said base plate but permitting said upper plates to be flexed downward under pressure of a vehicle wheel into contact with said base plate, said upper plates being slanted at a slight angle with the long axis of said base plate to enable transversely spaced wheels of a vehicle to cooperate to obtain overlapping closure of the adjacent contacts in traversing the treadle, and a resilient insulating casing covering said upper contacts and attached to said base plate and connecting leads for external electrical connection to the respective plates.

8. A multi-switch treadle unit for road traffic, including a plurality of switches elongated transverse to the direction of passage of traffic, and said switches being arranged closely adjacent in succession at a slight angle to the perpendicular to such direction, said slight angle being of the order of one inch of displacement with respect to said perpendicular for eight feet along said perpendicular, to enable corresponding wheels on opposite sides of a vehicle to close the switches in overlapping sequence despite non-overlapping closure of successive switches by the respective wheels individually.

9. In a circuit for response to the rolling wheels of vehicles in a road traffic lane only upon an overlapping sequence of actuation of successive electrical contacts, a multi-switch treadle unit including a plurality of successive contacts elongated transverse to the direction of passage of traffic, said contacts being arranged closely adjacent in succession in such direction and at a slight angle to the perpendicular to such direction, said angle being of the order of one inch of displacement with respect to said perpendicular for eight feet along said perpendicular, to enable corresponding wheels on opposite sides of a vehicle to actuate the contacts in overlapping sequence despite non-overlapping actuation of successive contacts by the respective wheels individually.

10. A treadle unit for road traffic, including elongated base contact means, a pair of elongated relatively narrow upper contact plates arranged side by side over said base contact means, spacing means for supporting said upper contact plates along the edges thereof to maintain them normally separated from said base contact means but permitting said upper plates to be depressed under pressure of a vehicle wheel into contact with said base contact means, said upper plates being slanted at a slight angle with the long axis of said base contact means to enable transversely spaced wheels of a vehicle to cooperate to obtain overlapping closure of the adjacent contacts in traversing the treadle, and a resilient insulating casing covering said upper contacts and attached to said base contact means, and connecting leads for external electrical connection to the respective contact plates and contact means.

11. A treadle unit as in claim 7 and in which said slight angle is of the order of one inch of displacement from said long axis for eight feet along said long axis.

12. A treadle switch unit as in claim 4 and in which said slight angle is of the order of one inch of displacement from said long axis for eight feet along said long axis.

13. In a circuit for response to the rolling wheels of vehicles in a road traffic lane and including a multi-switch treadle unit for disposal transverse to said lane and having adjacent switches arranged to be actuated in sequence by a wheel rolling thereover, and relay means connected to be controlled by said switches to provide a desired output only in response to overlapping actuation of adjacent switches in such sequence, the improvement of having said switches slanted at a slight angle to a perpendicular to the direction of the traffic in said lane to provide such overlap of actuation of adjacent switches by the cooperation of transversely spaced wheels of a vehicle traversing said treadle unit.

14. In an electrical circuit for response to rolling wheels of a vehicle passing in a predetermined direction in a traffic lane and responding only upon an overlapping sequence of actuation of successive electrical contacts, a first pair of switch contact means for producing successive impulses in response to one of a pair of substantially spaced vehicle wheels passing substantially abreast along said traffic lane, a second pair of switch contact means for producing successive impulses in response to the other of said pair of vehicle wheels, said first pair of switch contact means being displaced along said direction slightly ahead of said second pair of switch contact means, means connecting one member of said first pair of switch means to a corresponding first member of said second pair of switch means, and means connecting the second member of said first pair of switch means to a corresponding second member of said second pair of switch means thereby providing a partially overlapping sequence of said successive impulses due to said displacement and irrespective of non-overlap of successive impulses from individual wheels.

15. In an electrical circuit for response to the rolling wheels of a vehicle passing along a direction in a road traffic lane, said circuit responding only upon an overlapping sequence of actuation of successive electrical contact means, a multi-contact treadle unit including a plurality of successive contact means elongated transversely to said direction of travel, said contact means being arranged closely adjacent in succession in such direction and having elongated zones for actuation by corresponding wheels at opposite sides of such vehicles, said contact means in the zones for the respective such opposite wheels being displaced relative to each other in the general direction across the treadle corresponding to such direction of passage thereover, such that the second of two successively adjacent contact means in one such zone for one wheel will be actuated by the forward part of such wheel in contact with the treadle while the first of the two successive contact means in the zone for the opposite wheel is still actuated by the trailing part of the latter said opposite wheel while the two wheels are substantially abreast in such traffic lane, the first of the successive contact means at the respective zones being connected together and the second of the successive means of the respective zones being connected together to provide a positive overlap in the sequence of actuation of the contact means by said corresponding opposite wheels rolling over the treadle.

16. A multi-contact treadle unit for use in an electrical circuit for response to the rolling wheels of a vehicle passing along a direction in a road traffic lane, said circuit responding only upon an overlapping sequence of actuation of successive electrical contact means, said treadle unit comprising a plurality of successive contact means elongated transversely to said direction of travel, said contact means being arranged closely adjacent in succession in such direction and having elongated zones for actuation by corresponding wheels at opposite sides of such vehicles, said contact means in the zones for the respective such opposite wheels being displaced relative to each other in the general direction across the treadle corresponding to such direction of passage thereover, such that the second of two successively adjacent contact means in one such zone for one wheel will be actuated by the forward part of such wheel in contact with the treadle while the first of the two successive contact means in the zone for the opposite wheel is still actuated by the trailing part of the latter said opposite wheel while the two wheels are substantially abreast in such traffic lane, the first of the successive contact means at the respective zones being connected together and the second of the successive means of the respective zones being connected together to provide a positive overlap in the sequence of actuation of the contact means by said corresponding opposite wheels rolling over the treadle.

References Cited in the file of this patent
UNITED STATES PATENTS

| | | |
|---|---|---|
| 1,928,472 | Wilcox | Sept. 26, 1933 |
| 1,972,534 | Olafson | Sept. 4, 1934 |
| 1,975,527 | Zeiger | Oct. 2, 1934 |
| 2,126,431 | Von Opel | Aug. 9, 1938 |
| 2,164,177 | Jones | June 27, 1939 |
| 2,173,089 | Geer et al. | Sept. 19, 1939 |